United States Patent
Wright et al.

(10) Patent No.: US 9,771,473 B2
(45) Date of Patent: *Sep. 26, 2017

(54) HIGH FLOW, HYDROGENATED STYRENE-BUTADIENE-STYRENE BLOCK COPOLYMERS AND APPLICATIONS

(71) Applicant: Kraton Polymers U.S. LLC, Houston, TX (US)

(72) Inventors: Kathryn Wright, Katy, TX (US); Hiroshi Kato, Tsukuba (JP)

(73) Assignee: Kraton Polymers U.S. LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/940,663

(22) Filed: Jul. 12, 2013

(65) Prior Publication Data

US 2013/0299731 A1    Nov. 14, 2013

Related U.S. Application Data

(63) Continuation-in-part of application No. 13/404,150, filed on Feb. 24, 2012, now abandoned.

(51) Int. Cl.
| | |
|---|---|
| C08L 53/02 | (2006.01) |
| C09J 153/02 | (2006.01) |
| C08K 3/22 | (2006.01) |
| C08K 3/26 | (2006.01) |
| C08K 7/14 | (2006.01) |
| C08K 5/07 | (2006.01) |
| C08K 5/101 | (2006.01) |

(52) U.S. Cl.
CPC ............. *C08L 53/025* (2013.01); *C08K 3/22* (2013.01); *C08K 3/26* (2013.01); *C08K 7/14* (2013.01); *C09J 153/02* (2013.01); *C09J 153/025* (2013.01); *C08K 5/07* (2013.01); *C08K 5/101* (2013.01); *C08K 2003/2241* (2013.01); *C08K 2003/265* (2013.01)

(58) Field of Classification Search
None
See application file for complete search history.

(56) References Cited

U.S. PATENT DOCUMENTS

| | | |
|---|---|---|
| RE27,145 E | 6/1971 | Jones |
| 3,595,942 A | 7/1971 | Wald et al. |
| 3,634,549 A | 1/1972 | Shaw et al. |
| 3,670,054 A | 6/1972 | De La Mare et al. |
| 3,686,366 A | 8/1972 | Winkler |
| 3,700,633 A | 10/1972 | Wald et al. |
| 3,700,748 A | 10/1972 | Winkler |
| 3,753,938 A | 8/1973 | Hong |
| 3,985,830 A | 10/1976 | Fetters et al. |
| 4,039,593 A | 8/1977 | Kamienski et al. |
| 4,391,949 A | 7/1983 | St. Clair |
| 4,444,953 A | 4/1984 | St. Clair |
| 4,578,429 A | 3/1986 | Gergen et al. |
| 4,882,384 A | 11/1989 | Willis et al. |
| 4,898,914 A | 2/1990 | Gergen et al. |
| 4,970,265 A | 11/1990 | Willis |
| 5,194,535 A | 3/1993 | Koppes et al. |
| 5,210,147 A * | 5/1993 | Southwick et al. .......... 525/314 |
| 5,506,299 A | 4/1996 | Gelles et al. |
| 5,696,208 A | 12/1997 | Al-Ghatta et al. |
| 6,492,469 B2 | 12/2002 | Willis et al. |
| 6,503,620 B1 | 1/2003 | Xie et al. |
| 6,508,875 B1 | 1/2003 | Bodt et al. |
| 6,541,553 B1 * | 4/2003 | Erickson et al. ............. 524/270 |
| 6,657,000 B1 | 12/2003 | De Keyzer et al. |
| 6,987,142 B2 | 1/2006 | St. Clair et al. |
| 7,169,848 B2 | 1/2007 | Bening et al. |
| 7,267,855 B2 | 9/2007 | Handlin, Jr. et al. |
| 7,332,542 B2 | 2/2008 | Bening et al. |
| 7,348,376 B2 | 3/2008 | Gelles |
| 7,439,301 B2 | 10/2008 | Handlin |
| 7,737,206 B2 | 6/2010 | Ouhadi |
| 8,003,209 B2 | 8/2011 | Flood |
| 8,084,546 B2 | 12/2011 | Willis et al. |
| 8,119,237 B2 | 2/2012 | Peng et al. |
| 8,188,192 B2 | 5/2012 | Handlin, Jr. et al. |
| 8,679,622 B2 | 3/2014 | Delong et al. |

(Continued)

FOREIGN PATENT DOCUMENTS

| | | |
|---|---|---|
| CA | 716645 A | 8/1965 |
| EP | 733677 B1 | 8/2003 |

(Continued)

OTHER PUBLICATIONS

Bovey, F.A., High Resolution NMR of Macromolecules (Academic Press, New York and London) 1972, Chapter 6.
International Search Report dated Oct. 22, 2014.
International Search Report for PCT/US2013/27009 dated Jun. 28, 2013.
Supplementary Partial European Search Report for EP13769284, dated Oct. 15, 2015.

*Primary Examiner* — Jeffrey Mullis
(74) *Attorney, Agent, or Firm* — Ekatherina Serysheva

(57) ABSTRACT

The invention relates to unique applications for the novel high melt flow, low viscosity, selectively hydrogenated styrene-butadiene-styrene (hSBS) or selectively hydrogenated controlled distribution styrene-butadiene/styrene-styrene (hSBSS) block copolymers, wherein the melt flow rate of said block copolymer is at least 100 g/10 min. at 230° C. under 2.16 kg mass according to ASTM D1238. These block copolymers are novel and have the highest melt flow rate of any styrenic block copolymer also possessing high strength and elasticity. It has applications that prior to the present invention were not normally possible due to the normal low melt flow rate of styrenic block copolymers. The present invention also encompasses various fields of use such as a fiberglass hSBS or hSBSS reinforced mat, low viscosity hSBS or hSBSS coatings for industrial uses, hot melt adhesives prepared from hSBS or hSBSS blended with polyalpha-olefins, and elastic film, fiber, and nonwoven constructions using hSBS or hSBSS.

7 Claims, 1 Drawing Sheet

(56) References Cited

U.S. PATENT DOCUMENTS

| | | | |
|---|---|---|---|
| 9,359,523 B2* | 6/2016 | Dubois | C08K 7/14 |
| 2003/0176574 A1 | 9/2003 | St. Clair et al. | |
| 2005/0119403 A1 | 6/2005 | St. Clair et al. | |
| 2005/0171251 A1 | 8/2005 | Nakajima et al. | |
| 2005/0197465 A1* | 9/2005 | Handlin, Jr. | 525/314 |
| 2005/0228114 A1 | 10/2005 | Gelles | |
| 2006/0182927 A1* | 8/2006 | Baldauf | D04B 21/02 |
| | | | 428/99 |
| 2006/0229390 A1* | 10/2006 | Chun | C08L 95/00 |
| | | | 524/59 |
| 2007/0004830 A1 | 1/2007 | Flood et al. | |
| 2007/0014952 A1 | 1/2007 | Delong et al. | |
| 2007/0066753 A1 | 3/2007 | Ehrlich et al. | |
| 2009/0050266 A1 | 2/2009 | Yang | |
| 2009/0093584 A1 | 4/2009 | Gelles et al. | |
| 2009/0163361 A1 | 6/2009 | Handlin, Jr. et al. | |
| 2009/0247033 A1 | 10/2009 | Peng | |
| 2009/0326134 A1 | 12/2009 | Berzinis | |
| 2010/0216915 A1 | 8/2010 | Bloom | |
| 2011/0003095 A1 | 1/2011 | Becker et al. | |
| 2011/0191928 A1 | 8/2011 | Ardiff et al. | |
| 2011/0263763 A1 | 10/2011 | Willis et al. | |
| 2013/0225020 A1* | 8/2013 | Flood et al. | 442/1 |
| 2013/0225751 A1* | 8/2013 | Cheng | C08F 112/08 |
| | | | 524/505 |
| 2014/0364532 A1* | 12/2014 | Dubois et al. | 523/105 |
| 2014/0364555 A1* | 12/2014 | Wiegand et al. | 524/505 |
| 2014/0371377 A1* | 12/2014 | Salazar | 524/505 |

FOREIGN PATENT DOCUMENTS

| | | |
|---|---|---|
| JP | 200525586 A | 9/2005 |
| JP | 2006342329 A | 12/2006 |
| WO | 0134719 A1 | 5/2001 |
| WO | 2005092979 A1 | 10/2005 |
| WO | 2005097031 A1 | 10/2005 |
| WO | 2011092071 A1 | 8/2011 |

* cited by examiner

HIGH FLOW, HYDROGENATED STYRENE-BUTADIENE-STYRENE BLOCK COPOLYMERS AND APPLICATIONS

FIELD OF THE INVENTION

The invention relates to high melt flow, low viscosity selectively hydrogenated styrene-butadiene-styrene (hSBS, also known as SEBS) or selectively hydrogenated controlled distribution styrene-butadiene/styrene-styrene (hS-B/S-S, also known as styrene-ethylene butadiene/styrene-styrene (S-EB/S-S)) block copolymers and applications therefore, wherein the melt flow rate is at least 100 g/10 min. at 230° C. under a 2.16 kg mass according to ASTM D1238. These block copolymers are novel and have significantly higher melt flow rates than other known styrenic block copolymers and also exhibit surprising high strength and elasticity. They have applications that, prior to the present invention, were not possible due to the normally low melt flow rate of styrenic block copolymers.

BACKGROUND OF THE INVENTION

Melt flow rate (MFR) is inversely correlated to viscosity of the polymer. A high melt flow rate means that the polymer has a low viscosity and vice versa. While a few styrenic block copolymers have high melt flow rates, they achieve that with a high (>60 wt. %) diblock content and therefore have comparatively poor mechanical properties. The highest reported melt flow rate for any styrenic block copolymer, in the absence of additives to lower the viscosity and thus increase the melt flow rate, is 81 g/10 min. (As used herein including the claims, unless otherwise stated, "melt flow" shall mean the melt flow value determined according to ASTM D-1238, at 230° C. under a 2.16 kg mass.) This melt flow rate is disclosed in the following patent.

U.S. Pat. No. 7,439,301 to Handlin, Jr. relates to coupled block copolymers having high melt flow and high elasticity. The true molecular weight for the block copolymer is between 40,000 to 70,000; the polystyrene content (PSC) is between 13 to 25%, the vinyl content is between 60 to 85%, and a coupling efficiency of 89 to 97%.

U.S. Pat. No. 7,169,848 to Bening et al discloses selectively hydrogenated controlled distribution hS-B/S-S. The highest MFR in the examples is 17 g/10 min.

Historically, composite systems have been based on fiberglass mat plies or layers in addition to a binder. The binder could include non-reactive or reactive polymeric binder such as polyester, vinyl ester or epoxy resins, or a non-reactive resin such as asphalt or bitumen. The fiberglass mat plies are commonly used as structural support components for the composite. Composites are often designed to have maximum impact resistance while maintaining low density so that weight can be minimized. Traditional composite designs achieve toughness either through toughening of the reactive resin through the addition of dispersed rubber particles that arrest crack growth or through the use of optimized sizings on the glass fibers in order to improve adhesion between the glass fibers and the reactive resin binder. Both toughening mechanisms can also be used simultaneously. Materials that enable new composite designs or structures to enhance toughening performance or enable new composite designs or processing techniques, while maintaining low density, are industrially relevant and desirable. These resins have long lay-up times as well as long cure times. Due to the volatility of these resins, as well as the hazards of loose fiberglass strands, the manufacturing process of traditional composites suffers from adverse health, safety, and environmental problems. Boat hulls and decks, automotive body panels, and aerospace components are prime examples where these types of composites find utility. Large parts like boat hulls and decks are often constructed in outdoor locations, or in areas where there is only a roof overhead to allow the fumes to exhaust to the environment and lessen exposure to the workers.

Low viscosity coatings using styrenic block copolymers are virtually unknown because the copolymers normally have such high viscosity. Often a balance must be achieved between low volatile organic compounds (VOC), high solids content, and low viscosity. Obtaining a low viscosity coating based on hSBS and hS-B/S-S, so that the coating can be sprayed or roll applied onto a substrate, generally requires the use of higher amounts of organic solvents which adversely increase the VOC content and reduce the solids content. Therefore, styrenic block copolymers previously had limited applicability for low viscosity coatings where the VOC requirement is ≤350 g/L.

Styrenic block copolymers (SBC) have been employed in the adhesive market for hot melt, quick release covering, and pressure sensitive adhesives. Adhesives made with traditional hSBS (SEBS) are typically high cost with high performance while those made with traditional SBS are more suited for mid-cost, mid-performance markets. They are typically unsuitable for low cost adhesive markets or applications requiring low spray temperature of <325° F. Typically metallocene polyolefins or amorphous poly alpha olefins (APO) are utilized in low cost, low performance applications but result in lower adhesion strength and temperature resistance properties, which are important for certain hot melt adhesive applications. U.S. Pat. No. 7,348,376 to Gelles describes the combination of low melt flow rate hSBS polymers with APOs. However, these formulations lack the viscosity needed for application at low spray temperatures of <325° F.

The novel compound of the present invention is different than more conventional hSBS or controlled distribution hS-B/S-S because it has a very high melt flow rate, a corresponding low viscosity, and good tensile strength and elasticity. This also makes it possible for such polymers to participate in markets not typically considered, such as toughening fiberglass, low viscosity—low VOC polymer coatings, adhesives based on blended systems requiring low viscosity for improved processability, and film and nonwoven personal hygiene applications. Thus there is a need for high melt flow rate hSBC products that have good performance characteristics such as strength and elasticity.

SUMMARY OF THE INVENTION

All ranges set forth in the specification and claims include not only the end point of the ranges, but also every conceivable number between the end point of the ranges, since that is the very definition of a range. For example, ranges specifying the molecular weight, polystyrene content, vinyl content, coupling efficiency, etc, are intended to include this definition of a range.

The present invention encompasses a novel hSBS (S-EB-S) or hS-B/S-S(S-EB/S-S) that possess a high melt flow rate, low viscosity, high strength, and good elastic properties. In particular, the styrenic block copolymer comprises a melt flow rate equal to or greater than 100 g/10 min., a minimum linear true peak molecular weight (Mp) of about 45,000, a PSC of between about 18 to about 45%, a vinyl content of about 65 to 80%, and a coupling efficiency of about 60 to about 97%, said styrenic block copolymer having a structure consistent with either sequential polymerization of each block polymer, or coupled polymerization wherein diblocks (S-EB or S-EB/S) are formed, and 2 or more diblocks are coupled together via a coupling agent. Thus the styrenic block copolymer may be selectively hydrogenated poly (monoalkenylarene-diene-monoalkenylarene), or poly (monoalkenylarene-diene)nX, or controlled distribution poly(monoalkenylarene-diene/monoalkenylarene-monoalkenylarene) or poly(monoalkenylarene-diene/monoalkenylarene)nX. The monoalkenylarene monomer is preferably selected from the group consisting of styrene, alpha-methylstyrene, para-methylstyrene, tertiary-butyl styrene, vinyl toluene and the like or mixtures thereof; of these, styrene is the most preferred. The diene monomer can be any aliphatic conjugated diene including 1,3-butadiene or substituted butadienes such as isoprene or mixtures thereof; of these, 1,3-butadiene is the most preferred. As used herein, and in the claims, "butadiene" refers specifically to "1,3-butadiene". Thus S is selected from the group consisting of styrene, alpha-methylstyrene, para-methylstyrene, tertiary-butyl styrene, vinyl toluene and the like or mixtures thereof, and B is selected from 1,3-butadiene or substituted butadienes such as isoprene or mixtures thereof. For the purposes of explaining the invention S will be described as styrene and B as butadiene, but the broad invention encompasses the groups of S and B respectively. An hSBS of selectively hydrogenated poly(styrene-butadiene-styrene) is also known as S-EB-S, while an hSBSS of selectively hydrogenated controlled distribution poly(styrene-butadiene/styrene-styrene) is also known as S-EB/S-S. These styrenic block copolymers may be functionalized in a number of ways to include reactive groups such as carboxylic acids and their salts, anhydrides, esters, imides, amides, amide and acid chloride groups.

The present invention also encompasses various fields of use, such as toughened fiberglass hSBS or hSBSS reinforced mats for composite applications, low viscosity hSBS or hSBSS coatings for industrial uses, hot melt adhesives prepared from hSBS or hSBSS blends with APOs, elastic films, melt blown fibers and articles, and low viscosity molding applications, such as slush molding, rotational molding, or injection molding. Finally, blends of coupled hSBS with tackifier have a MFR in the range of at least about 15 to >200 g/10 min. at 160° C. and 2.16 kg. All other MFR in this application are measured at 230° C.

Specifically, coated ceramic or polymeric fibers or bundles of fibers are often used to reinforce polymeric materials and constructions. Fiber-reinforced polymers (FRP) can be of the thermoset or thermoplastic type. When reinforcing thermoset polymers, the fiber reinforcement is typically in the form of a chopped, non-woven, or wet-laid mat or woven scrim. When reinforcing thermoplastic materials, the fiber reinforcement is typically in the form of chopped fibers either short or long in dimension. In order for the ceramic or polymeric fibers to transfer stress to the polymer matrix, a sizing or coating is sometimes applied to the surface of the fibers or bundles of fibers. Many different techniques have been developed to coat ceramic or polymeric fibers or bundles of fibers. These techniques may be restricted by high melt or solution viscosities of the polymeric coatings. As such, low viscosity hSBS or hSBSS or maleated hSBS or hSBSS finds utility as a sizing agent or coating when bonded to the surface of individual ceramic or polymeric fibers or bundles of fibers. The terms "ceramic" and "polymeric" fibers include but are not limited to glass fiber (or fiberglass), carbon fiber, aramid fiber, and polyester fiber.

Specifically, a fiberglass reinforced mat, comprising: a woven, nonwoven, chopped, or wet laid fiberglass mat or scrim (herein referred to as mat) and an hSBS or hSBSS block copolymer article bonded to said mat; said hSBS or hSBSS block copolymer having a melt flow rate equal to or greater than 100 g/10 min., wherein when 140 g/m$^2$ (grams per square meter) of said styrenic block copolymer is applied to said mat, the average impact energy is at least 3 times larger than without said styrenic block copolymer. The amount of styrenic block copolymer of the present invention in a reinforced mat or scrim is about 50 to about 500 g/m$^2$. Preferably the amount of styrenic block copolymer of the present invention in a reinforced mat or scrim is about 50 to about 200 g/m$^2$. Such reinforced mats possess an average impact energy of at least 2 times, and preferably at least 3 times (or more), than mats without the hSBS or hSBSS block copolymer of the present invention. Maleated hSBS or hSBSS finds utility as a sizing agent when bonded to the surface of individual glass fibers. Alternatively, other rigid fibers routinely used in composite articles, such as carbon fibers, may be used in place of fiberglass.

Low viscosity coatings containing solvent and styrenic block copolymers of the present invention are primarily used in industrial and marine applications, in coating metal to prevent corrosion, or concrete to protect against certain chemical attack, such as oil. Such coatings may further contain a slip additive, a component making said coating removable, such as a protective coating; a corrosion resistant additive, a shatter-proof additive, a primer additive, or a maintenance corrosion resistance additive such as iron oxide.

Specifically, a low viscosity hSBS or hSBSS polymer coating formulation, comprising: a blend of solvent and hSBS or hSBSS block copolymer; said block copolymer having a melt flow rate equal to or greater than 100 g/10 min., wherein said solvent is selected from the class of non-exempt organic solvents or exempt solvents or mixtures thereof. Exempt solvents include: methyl acetate, para-chlorobenzotriflouride, tertiary-butyl acetate, or acetone, wherein said blend is at least 50 wt. % solids. The blend may also contain at least one other ingredient selected from the group of endblock resin, midblock resin, polyisobutylene polymers, polyphenylene ether, and/or one or more fillers such as $TiO_2$, $CaCO_3$, carbon black, or other pigments, and said coating having a Brookfield viscosity<150,000 cps as measured by ASTM D2196A. These low viscosity polymer coating formulations may also include reactive monomers such as epoxy, acrylic, styrenic, vinyl-ester, or polyester resin. Such coatings find utility in industrial and marine applications. Functionalized polymers of the present invention, such as maleic anhydride grafted onto the backbone of hSBS or hSBSS polymers also find utility in low viscosity polymer coatings.

Specifically, applications of pure wax are limited due to their brittle nature and poor strength and elasticity. As such, modified wax compositions comprising the addition of midblock resin(s), additives such as EVA or/and PE wax, organic fillers, and hydrogenated styrenic block copolymers have utility in applications such as investment casting, flexible packaging wax (paper/film/foil-based, in-mold labeling, confectionery wrap, cheese & butter wrap, coffee packaging), hot melt adhesive wax, general industrial wax, cosmetic and pharmaceutical wax (crèmes and ointments, decorative cosmetics, depilatory wax, medical wax) paper and board converting (board & sheet laminating, multi wall paper bags & sacks, envelopes, security & document bags, tube winding, case & carton, labeling), construction (roof insulation, roofing membranes, sandwich panels), product assembly (strapping, air filters), emulsions, wax coatings, food (chewing gum and dairy), wax extrusion, tire & rubber (tires, technical rubber articles), and other industrial applications. However, even in these areas the ability to improve toughness and elasticity of the modified wax has been limited by the low melt flow rate (high viscosity) of traditional hSBS polymers. For example, modification of wax with the addition of Kraton G1652 which is considered to be a relatively low molecular weight hSBS is limited to <5% due to the upper viscosity limit for sufficient processability.

Suitable midblock compatible resins are $C_5$ resin (pentadiene resin, pentene, etc.), hydrogenated $C_5$ resin, terpene resin, rosin ester resin, or combinations thereof.

Suitable organic fillers are crosslinked polystyrene, bisphenol acid, terephthalic acid or combinations thereof and have a particle size of less than 200 microns.

High melt flow hSBS polymers of the present invention in blends containing microcrystalline wax, polyethylene wax, naphthalene wax, paraffin wax, and less refined wax or combinations thereof are of interest in modified wax applications to improve strength, toughness, and elasticity, yet remain sufficiently ridged while maintaining a formulated viscosity of about 2,000-10,000 cps, more preferably 3,000-5,000 cps measured via cone and plate rheometry at 140° F. and 50 $sec^{-1}$. Low temperature, impact resistance, lower moisture vapor transmission rate, and improved flex crack resistance are also beneficial features that the low viscosity polymers bring to modified wax applications. Examples of applications are investment casting where wax is brittle for large molds or very thin parts. High margin investment casting molds are used in automotive, aerospace, medical body prosthetic replacement (e.g. knee and hip parts), and leisure sports (e.g. golf parts) industries.

High melt flow (low viscosity) hSBS polymers are also of interest to modify less refined wax where oil bleed out must be controlled such as scale wax. The use of high melt flow hSBS polymers to improve strength, toughness, and elasticity of less refined wax adds value to the system economics as less refined wax is less expensive and more plentiful.

Specifically, an adhesive composition comprising: a blend of amorphous poly-alpha-olefin, hSBS or hSBSS block copolymer, and tackifier; said block copolymer having a melt flow rate equal to or greater than 100 g/10 min., said amorphous poly-alpha-olefin is present from about 30 to about 80 wt. % of said composition, said block copolymer is present from about 10 to about 35 wt. % of said composition, and said tackifier is present from about 20 to about 60 wt. % of said composition.

Specifically, a pressure sensitive adhesive comprising hSBS and tackifier have a melt flow rate between 125 g/10 min. at 160° C. and 2.16 kg. The tackifier is either a fully or partially hydrogenated $C_9$ resin, or a rosin ester. The tackifier, based on 100 wt. parts per hundred parts polymer, is present in the range of about 5 to 250 wt. parts. Laminating the polymer on a nylon substrate produced superior adhesive strength until the strength exhibited surging due to rigidity. Typical fully or partially hydrogenated $C_9$ tackifers were Regalite S5100 and R1100, by Eastman Chemical Co. The tackifier may also be a rosin ester such as KE-311 from Arakawa Chemical.

Specifically, a film or melt blown article containing hSBS or hSBSS having a low molecular weight in a range between 45,000 to 65,000, with a melt flow rate equal to or greater than 100 g/10 min. has excellent strength and elasticity, as defined by a film article having a tensile strength >10 MPa and elongation >500% in addition to a hysteresis set after 100% elongation of about 5%. The melt blown elastic article at 50 $g/m^2$ (grams per square meter) has excellent elasticity, defined by having an ultimate tensile elongation >400%, with 100% hysteresis recovered energy >80%, and permanent set <10%.

A melt blown fabric may further include at least one additional nonwoven layer comprised of thermoplastic polymer comprising spunbond, bicomponent spunbond, melt blown, or a bonded-carded-web layer used in the construction of an adsorbent personal hygiene product such as a baby diaper article, adult incontinence article, or feminine napkin article. Furthermore the non-woven laminate can be made more elastic via an activation process such as tentering, drawing and ring rolls. Melt blown articles may contain an additional component of high flow polyolefin having a melt flow rate >40 g/10 min., polyisobutylene, polybutene, thermoplastic polyurethane, thermoplastic copolyester, oil, styrenic block copolymer with melt flow rate <100 g/10 min., and/or mid block or end block resins, such as Oppera 100A, Regalrez 1126, or Kristalex 5140.

Specifically, a slush molding or rotational molding composition, such as is disclosed in EP 0733677 or WO 2011/092071 employs, styrenic block copolymer, wherein the molding composition has a melt index in the range from 5 to 75, but examples disclose 40 to 89 g/10 min. at 190° C. with 2.16 kg mass.

Specifically, an aqueous based emulsion of the styrenic block copolymer of the present invention (hSBS and or hS-B/S-S) having the low melt flow rate and molecular weight described previously may be employed as a coating. The coating may optionally include functionalized styrenic block copolymers of the invention, less than 20 wt. % organic solvent, and/or tackifying resin.

Either the solvent based or aqueous based coating, mentioned previously, may find utility by impregnating a fabric (woven or nonwoven) or felt. Likewise the coating may include a foaming agent and be incorporated in foamed articles.

Selectively hydrogenated styrenic block copolymers having a melt index of >100 g/10 min. are novel and find utility in at least all the areas mentioned above.

DESCRIPTION OF THE PREFERRED EMBODIMENTS

Figure 1:
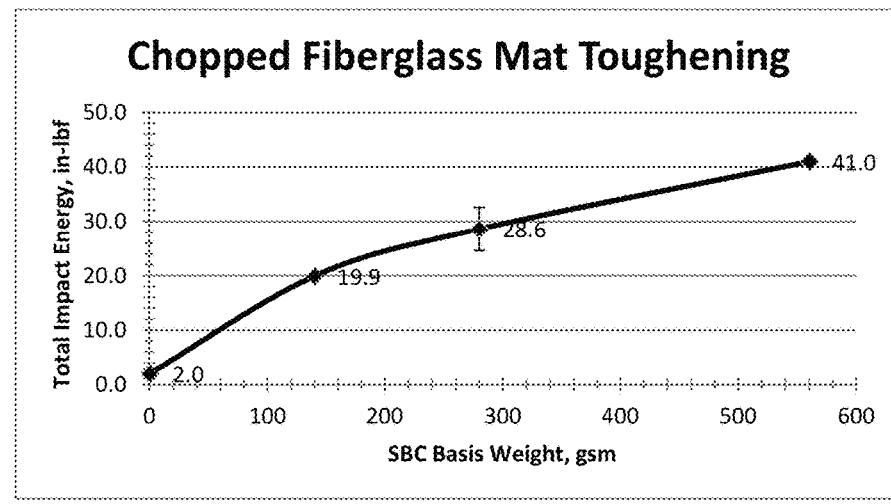
FIG. 1 is a graph of chopped fiberglass mat toughening shown by Total Impact Energy in inch-pound force vs. hSBS basis weight in grams per square meter, as tabulated in Table 1.

As used herein, unless otherwise noted, the term "molecular weights" refers to the true molecular weight in g/mol of the polymer or block of the copolymer. The molecular weights referred to in this specification and claims can be measured with gel permeation chromatography (GPC) using polystyrene calibration standards, such as is done according to ASTM 3536. GPC is a well-known method wherein polymers are separated according to molecular size, the largest molecule eluting first. The chromatograph is calibrated using commercially available polystyrene molecular weight standards. The molecular weight of polymers measured using GPC so calibrated are styrene equivalent molecular weights, also known as apparent molecular weights. The styrene equivalent molecular weight may be converted to true molecular weight when the styrene content of the polymer and the vinyl content of the diene segments are known. The detector used is preferably a combination ultraviolet and refractive index detector. The molecular weights expressed herein are measured at the peak of the GPC trace, converted to true molecular weights, and are commonly referred to as "peak molecular weights". When expressed as apparent molecular weights they are similarly determined with the exception that consideration of the block copolymer composition and the subsequent conversion to true molecular weights is not done.

Starting materials for preparing the block copolymers of the present invention include the initial monomers. The alkenyl arene can be selected from styrene, alpha-methylstyrene, para-methylstyrene, vinyl toluene, vinylnaphthalene, and para-butyl styrene or mixtures thereof. Of these, styrene is most preferred and is commercially available, and relatively inexpensive, from a variety of manufacturers.

The conjugated dienes for use herein are 1,3-butadiene and substituted butadienes such as isoprene, piperylene, 2,3-dimethyl-1,3-butadiene, and 1-phenyl-1,3-butadiene, or mixtures thereof. Of these, 1,3-butadiene is most preferred. As used herein, and in the claims, "butadiene" refers specifically to "1,3-butadiene".

Other important starting materials for anionic co-polymerizations include one or more polymerization initiators. In the present invention such include, for example, alkyl lithium compounds and other organolithium compounds such as s-butyllithium, n-butyllithium, t-butyllithium, amyllithium and the like, including di-initiators such as the di-sec-butyl lithium adduct of m-diisopropenyl benzene. Other such di-initiators are disclosed in U.S. Pat. No. 6,492,469. Of the various polymerization initiators, s-butyllithium is preferred. The initiator can be used in the polymerization mixture (including monomers and solvent) in an amount calculated on the basis of one initiator molecule per desired polymer chain. The lithium initiator process is well known and is described in, for example, U.S. Pat. Nos. 4,039,593 and Re. 27,145, which descriptions are incorporated herein by reference.

The solvent used as the polymerization vehicle may be any hydrocarbon that does not react with the living anionic chain end of the forming polymer, is easily handled in commercial polymerization units, and offers the appropriate solubility characteristics for the product polymer. For example, non-polar aliphatic hydrocarbons, which are generally lacking in ionizable hydrogens make particularly suitable solvents. Frequently used are cyclic alkanes, such as cyclopentane, cyclohexane, cycloheptane, and cyclooctane, all of which are relatively non-polar. Other suitable solvents will be known to one skilled in the art and can be selected to perform effectively in a given set of process conditions, with temperature being one of the major factors taken into consideration.

Preparation of radial (branched) polymers requires a post-polymerization step called "coupling". It is possible to have either a branched selectively hydrogenated block copolymer and/or a branched tailored softening modifier. In the above radial formula for the selectively hydrogenated block copolymer, n is an integer of from 2 to about 30, preferably from about 2 to about 15, and X is the remnant or residue of a coupling agent. A variety of coupling agents are known in the art and include, for example, dihalo alkanes, silicon halides, siloxanes, multifunctional epoxides, silica compounds, esters of monohydric alcohols with carboxylic acids, (e.g. dimethyl adipate) and epoxidized oils. Star-shaped polymers are prepared with polyalkenyl coupling agents as disclosed in, for example, U.S. Pat. Nos. 3,985,830; 4,391,949; and 4,444,953; Canadian Pat. No. 716,645. Suitable polyalkenyl coupling agents include divinylbenzene, and preferably m-divinylbenzene. Preferred are tetra-alkoxysilanes such as tetra-ethoxysilane (TEOS) and tetra-methoxysilane, alkyl-trialkoxysilanes such as methyltrimethoxy silane (MTMS), aliphatic diesters such as dimethyl adipate and diethyl adipate, and diglycidyl aromatic epoxy compounds such as diglycidyl ethers deriving from the reaction of bis-phenol A and epichlorohydrin.

Coupling efficiency is of critical importance in the synthesis of block copolymers, which copolymers are prepared by a linking technology. In a typical anionic polymer synthesis, prior to the coupling reaction, the unlinked arm has only one hard segment (typically polystyrene). Two hard segments are required in the block copolymer if it is to contribute to the strength mechanism of the material. Uncoupled arms dilute the strength forming network of a block copolymer that weakens the material. The very high coupling efficiency realized in the present invention is key to making high strength, coupled, block copolymers.

Another important aspect of the present invention is to control the microstructure or vinyl content of the conjugated diene in the B block. The term "vinyl" has been used to describe the polymer product that is made when 1,3-butadiene is polymerized via a 1,2-addition mechanism. The result is a monosubstituted olefin group pendant to the polymer backbone, a vinyl group. In the case of anionic polymerization of isoprene, insertion of the isoprene via a 3,4-addition mechanism affords a geminal dialkyl C=C moiety pendant to the polymer backbone. The effects of 3,4-addition polymerization of isoprene on the final properties of the block copolymer will be similar to those from 1,2-addition of butadiene. When referring to the use of butadiene as the conjugated diene monomer, it is preferred that about 10 to 80 mol percent of the condensed butadiene units in the polymer block have a 1,2-addition configuration. Preferably, from about 30 to about 80 mol percent of the condensed butadiene units should have 1,2-addition configuration. When referring to the use of isoprene as the conjugated diene, it is preferred that about 5 to 80 mol percent of the condensed isoprene units in the block have 3,4-addition configuration. Polymer microstructure (mode of addition of the conjugated diene) is effectively controlled by addition of an ether, such as diethyl ether, a diether such as 1,2-diethoxypropane, or an amine as a microstructure modifier to the diluent. Suitable ratios of microstructure modifier to lithium polymer chain end are disclosed and taught in U.S. Pat. No. Re. 27,145.

It is well known in the art to modify the polymerization of the conjugated diene block to control the vinyl content. Broadly, this can be done by utilizing an organic polar compound such as ether, including cyclic ethers, polyethers and thioethers or an amine including secondary and tertiary amines. Both non-chelating and chelating polar compounds can be used.

Among the polar compounds which may be added in accordance with the one aspect of this invention are dimethyl ether, diethyl ether, ethyl methyl ether, ethyl propyl ether, dioxane, dibenzyl ether, diphenyl ether, dimethyl sulfide, diethyl sulfide, tetramethylene oxide (tetrahydrofuran), tripropyl amine, tributyl amine, trimethyl amine, triethyl amine, pyridine and quinoline and mixtures thereof.

In the present invention "chelating ether" means an ether having more than one oxygen as exemplified by the formula $R(OR')_m(OR'')_o OR$ where each R is individually selected from 1 to 8, preferably 2 to 3, carbon atom alkyl radicals; R' and R" are individually selected from 1 to 6, preferably 2 to 3, carbon atom alkylene radicals; and m and o are independently selected integers of 1-3, preferably 1-2. Examples of preferred ethers include diethoxypropane, 1,2-dioxyethane (dioxo) and 1,2-dimethyoxyethane (glyme). Other suitable materials include $CH_3\ OCH_2\ CH_2\ OCH_2\ CH_2\ OCH_3$ ($C_6H_{14}O_3$-diglyme) and $CH_3CH_2\ OCH_2\ CH_2\ OCH_2CH_2—OCH_2\ CH_3$. "Chelating amine" means an amine having more than one nitrogen such as N,N,N',N'-tetramethylethylene diamine.

The amount of polar modifier is controlled in order to obtain the desired vinyl content in the conjugated diene block. The polar modifier is used in an amount of at least 0.1 moles per mole of lithium compound, preferably 1-50, more preferably 2-25, moles of promoter per mole of the lithium compound. Alternatively, the concentration can be expressed in parts per million by weight based on the total weight of solvent and monomer. Based on this criteria from 10 parts per million to about 1 weight percent, preferably 100 parts per million to 2000 parts per million are used. This can vary widely, however, since extremely small amounts of some of the preferred modifiers are very effective. At the other extreme, particularly with less effective modifiers, the modifier itself can be the solvent. Again, these techniques are well known in the art, disclosed for instance in Winkler, U.S. Pat. No. 3,686,366 (Aug. 22, 1972), Winkler, U.S. Pat. No. 3,700,748 (Oct. 24, 1972) and Koppes et al, U.S. Pat. No. 5,194,535 (Mar. 16, 1993), the disclosures of which are hereby incorporated by reference.

Hydrogenation can be carried out via any of the several hydrogenation or selective hydrogenation processes known in the prior art. For example, such hydrogenation has been accomplished using methods such as those taught in, for example, U.S. Pat. Nos. 3,595,942; 3,634,549; 3,670,054; 3,700,633; and Re. 27,145, the disclosures of which are incorporated herein by reference. These methods operate to hydrogenate polymers containing aromatic or ethylenic unsaturation and are based upon operation of a suitable catalyst. Such catalyst, or catalyst precursor, preferably comprises a Group VIII metal such as nickel or cobalt which is combined with a suitable reducing agent such as an aluminum alkyl or hydride of a metal selected from Groups I-A, II-A and III-B of the Periodic Table of the Elements, particularly lithium, magnesium or aluminum. This preparation can be accomplished in a suitable solvent or diluent at a temperature from about 20° C. to about 80° C. Other catalysts that are useful include titanium based catalyst systems.

The selectively hydrogenated controlled distribution styrene-diene/styrene-styrene block copolymers applied in the present invention have been described in U.S. Pat. No. 7,169,848 to Bening et al. These block copolymers have mixed monomer rubbery blocks (conjugated diene/mono alkenyl arene) which are made by the combination of a unique control for the monomer addition and the use of diethyl ether or other modifiers as a component of the solvent (which will be referred to as "distribution agents") which results in a certain characteristic distribution of the two monomers (herein termed a "controlled distribution" polymerization, i.e., a polymerization resulting in a "controlled distribution" structure), and also results in the presence of certain mono alkenyl arene rich regions and certain conjugated diene rich regions in the polymer block. For purposes hereof, "controlled distribution" is defined as referring to a molecular structure having the following attributes: (1) terminal regions adjacent to the mono alkenyl arene homopolymer ("A") blocks that are rich in (i.e., having a greater than average amount of) conjugated diene units; (2) one or more regions not adjacent to the A blocks that are rich in (i.e., having a greater than average amount of) mono alkenyl arene units; and (3) an overall structure having relatively low blockiness. For the purposes hereof, "rich in" is defined as greater than the average amount, preferably greater than 5% the average amount. This relatively low blockiness can be shown by either the presence of only a single glass transition temperature ("Tg,") intermediate between the Tg's of either monomer alone, when analyzed using differential scanning calorimetry ("DSC") thermal methods or via mechanical methods, or as shown via proton nuclear magnetic resonance ("H-NMR") methods. The potential for blockiness can also be inferred from measurement of the UV-visible absorbance in a wavelength range suitable for the detection of polystyryllithium end groups during the polymerization of the B block. A sharp and substantial increase in this value is indicative of a substantial increase in polystyryllithium chain ends. In this process, this will only occur if the conjugated diene concentration drops below the critical level to maintain controlled distribution polymerization. Any styrene monomer that is present at this point will add in a blocky fashion. The term "styrene blockiness", as measured by those skilled in the art using proton NMR, is defined to be the proportion of S units in the polymer having two S nearest neighbors on the polymer chain. The styrene blockiness is determined after using H-1 NMR to measure two experimental quantities as follows:

First, the total number of styrene units (i.e. arbitrary instrument units which cancel out when ratioed) is determined by integrating the total styrene aromatic signal in the H-1 NMR spectrum from 7.5 to 6.2 ppm and dividing this quantity by 5 to account for the 5 aromatic hydrogens on each styrene aromatic ring.

Second, the blocky styrene units are determined by integrating that portion of the aromatic signal in the H-1 NMR spectrum from the signal minimum between 6.88 and 6.80 to 6.2 ppm and dividing this quantity by 2 to account for the two ortho hydrogens on each blocky styrene aromatic ring. The assignment of this signal to the two ortho hydrogens on the rings of those styrene units which have two styrene nearest neighbors was reported in *F. A. Bovey, High Resolution NMR of Macromolecules* (Academic Press, New York and London, 1972), Chapter 6. The styrene blockiness is simply the percentage of blocky styrene to total styrene units:

Blocky %=100 times(Blocky Styrene Units/Total Styrene Units)

Expressed thus, Polymer-Bd-S—(S)n-S-Bd-Polymer, where n is greater than zero is defined to be blocky styrene. For example, if n equals 8 in the example above, then the blockiness index would be 80%. It is preferred that the blockiness index be less than about 40. For some polymers, having styrene contents of ten weight percent to forty weight percent, it is preferred that the blockiness index be less than about 10.

Hydrogenation can be carried out under such conditions that at least about 90 percent of the conjugated diene double bonds have been reduced, and between zero and 10 percent of the arene double bonds have been reduced. Preferred ranges are at least about 95 percent of the conjugated diene double bonds reduced, and more preferably about 98 percent of the conjugated diene double bonds are reduced. Alternatively, it is possible to hydrogenate the polymer such that aromatic unsaturation is also reduced beyond the 10 percent level mentioned above. Such exhaustive hydrogenation is usually achieved at higher temperatures. In that case, the double bonds of both the conjugated diene and arene may be reduced by 90 percent or more. Once the hydrogenation is complete, it is preferable to extract the catalyst by stirring with the polymer solution a relatively large amount of aqueous acid (preferably 20-30 percent by weight), at a volume ratio of about 0.5 parts aqueous acid to 1 part polymer solution. Suitable acids include phosphoric acid, sulfuric acid and organic acids. This stirring is continued at about 50° C. for about 30 to about 60 minutes while sparging with a mixture of oxygen in nitrogen. Care must be exercised in this step to avoid forming an explosive mixture of oxygen and hydrocarbons.

Examples of various fillers that can be employed are found in the 1971-1972 Modern Plastics Encyclopedia, pages 240-247. A reinforcement may be defined simply as the material that is added to a resinous matrix to improve the strength of the polymer. Most of these reinforcing materials are inorganic or organic products of high molecular weight. Various examples include calcium carbonate, talc, silica, clays, glass fibers, asbestos, boron fibers, carbon and graphite fibers, whiskers, quartz and silica fibers, ceramic fibers, metal fibers, natural organic fibers, and synthetic organic fibers. Especially preferred are reinforced polymer blends of the instant invention containing about 2 to about 80 percent by weight calcium carbonate, based on the total weight of the resulting reinforced blend.

The polymer blends of the present invention may be compounded further with other polymers, oils, fillers, reinforcements, antioxidants, stabilizers, fire retardants, antiblocking agents, lubricants and other rubber and plastic compounding ingredients without departing from the scope of this invention.

Tackifying resins include polystyrene block compatible resins and midblock compatible resins. The polystyrene block compatible resin may be selected from the group of coumarone-indene resin, polyindene resin, poly(methyl indene) resin, polystyrene resin, vinyltoluene-alphamethylstyrene resin, alphamethylstyrene resin and polyphenylene ether, in particular poly(2,6-dimethyl-1,4-phenylene ether). Such resins are e.g. sold under the trademarks "HERCURES", "ENDEX", "KRISTALEX", "NEVCHEM" and "PICCOTEX". Resins compatible with the hydrogenated (mid) block may be selected from the group consisting of compatible C5 hydrocarbon resins, hydrogenated C5 hydrocarbon resins, styrenated C5 resins, C5/C9 resins, styrenated terpene resins, fully hydrogenated or partially hydrogenated C9 hydrocarbon resins, rosins esters, rosins derivatives and mixtures thereof. These resins are e.g. sold under the trademarks "REGALITE", "REGALREZ", "ESCOREZ" and "ARKON". The amount of tackifying resin employed varies from about 5 to about 100 parts by weight per hundred parts by weight rubber, or block copolymer, preferably about 20 to about 50 parts by weight. Also, one may use both a polystyrene block compatible resin and a midblock compatible resin.

The novel hSBS or hSBSS block copolymer has a melt flow rate ≥100 g/10 min. at 230° C., and 2.16 kg mass (ASTM D-1238), a minimum linear molecular weight of about 45,000 to about 65,000, a PSC of between about 18 to about 45%, a vinyl content of about 65 to 80%, and a coupling efficiency of about 60 to about 97%, said styrenic block copolymer being selectively hydrogenated styrene-butadiene-styrene (hSBS) or selectively hydrogenated controlled distribution styrene-butadiene/styrene-styrene (hSBSS). The novel hSBS or hSBSS is a styrenic block copolymer having a structure consistent with selectively hydrogenated poly(monoalkenylarene-diene-monoalkenylarene), poly(monoalkenylarene-diene)nX, controlled distribution poly(monoalkenylarene-diene/monoalkenylarene-monoalkenylarene), or poly(monoalkenylarene-diene/monoalkenylarene)nX. The monoalkenylarene monomer is preferably selected from the group consisting of styrene, alpha-methylstyrene, para-methylstyrene, tertiary-butyl styrene, vinyl toluene and the like or mixtures thereof of these styrene is the most preferred. The diene monomer can be any aliphatic conjugated diene including 1,3-butadiene or substituted butadienes such as isoprene or mixtures thereof of these 1,3-butadiene is the most preferred. As used herein and in the claims, "butadiene" refers specifically to "1,3-butadiene". The melt flow rate is achieved by hSBS or hSBSS wherein each styrene block has a peak molecular weight of between 5000 and 7000, and the total peak weight for either block copolymer is between 45,000 to 65,000. The polymer, before hydrogenation, can be linear or radial having the respective S-D-S or (S-D)nX structure where n is 2-3, S is styrene, D is diene or diene/styrene, and X is the coupling agent residue. The diene can be butadiene, isoprene, or mixtures thereof. Specifically the coupling agent could include but is not limited to Epon 825, 862, 826, silanes like methyltrimethoxy silane, tetramethoxy silane, dimethyldimethoxy silane, and chlorosilanes.

The styrenic block copolymers of the present invention can also be functionalized by the incorporation of grafted maleic anhydride, for example, onto the back bone of the block copolymer. In the alternative, the block copolymers of the present invention can be functionalized in a number of ways. One way is by treatment with an unsaturated monomer having one or more saturated groups or their derivatives such as carboxylic acid groups and their salts, anhydrides, esters, imides, amides, or acid chloride groups. The preferred monomers to be grafted onto the block copolymers are maleic anhydride, maleic acid, fumaric acid, or their derivatives. See U.S. Pat. Nos. 4,578,429 and 5,506,299. In another manner, the selectively hydrogenated block copolymer of the present invention may be functionalized by grafting silicon or boron containing compounds to the polymer as taught by U.S. Pat. No. 4,882,384. In yet another manner, the block copolymer of the present invention may be reacted with an alkoxy-silane compound to form silane-modified block copolymer. Also, the block copolymers of the present invention may be functionalized by grafting at least one ethylene oxide molecule to the polymer as taught by U.S. Pat. No. 4,898,914, or reacting the polymer with carbon dioxide as taught by U.S. Pat. No. 4,970,265.

Example 1: High Melt Flow hSBS Polymer hSBS: 201 kg Cyclohexane and 9.1 kg styrene were charged to an 80 gal. stainless steel reactor at about 50° C. 2428 mL of about 12 wt. % s-butyllithium were then charged to the reactor to initiate polymerization. The styrene polymerization was allowed to proceed at about 50° C. until completion and a sample was collected for GPC. The molecular weight at this step was determined to be 4.8 kg/mole. An additional 0.38 kg of styrene was added and allowed to polymerize. GPC analysis of this polymer indicated that the molecular weight was 5.0 kg/mole. Butadiene was added at a rate of about 1 kg/min. Within less than a minute of starting the butadiene program, 198 grams of 1,2-diethoxypropane were added and then the butadiene addition rate was increased to 1.5 kg/min. A total of 36.05 kg of butadiene was added, the temperature was maintained between about 50° C. and 55° C., and the polymerization was allowed to continue until completion. A sample collected at the end of this step had a molecular weight of 26.0 kg/mole, a vinyl content of 73.7% and a polystyrene content of 24.1% by $^1$H NMR. The S-B diblock polymer was then coupled by the addition of 114 mL of methyl trimethoxysilane, resulting in a polymer in which 94% of the diblock chains are coupled, the majority (82%) being linear, and the remainder being primarily 3-arm radial species. 55 ml of methanol were added to ensure termination. This polymer was then hydrogenated to a residual unsaturation of 0.12 meq olefin/g using a Co/Al catalyst (1.7:1 Al:Co (mole/mole), about 22 ppm Co) at 700 psi hydrogen, 85° C. to form a selectively hydrogenated styrene-butadiene-styrene polymer; about 60 kg of the total 125 kg of polymer solution was added in the initial batch charge and the remainder was added at a rate as required to maintain the reaction temperature in the desired range. The catalyst was oxidized and extracted by contacting the cement with aqueous phosphoric acid while sparging with an $N_2/O_2$ gas blend; in addition, about 100 mL of caprylic acid was added. The cement was then neutralized by sparging with ammonia, washed with deionized water and stabilized by the addition of Ethanox 330 (0.2 wt. % polymer basis) and Irgafos 168 (0.3 wt. % polymer basis). The resulting Inventive hSBS polymer had a melt flow rate of 220 g/10 min.

Application Examples of High Melt Flow hSBS

Example 2: Fiberglass Mats and Scrim

The technology of the present invention is expected to provide impact resistance and enhanced toughness to composites containing fiberglass mats and scrims with significantly improved manufacturing and health, safety, and environmental aspects. The hSBS or hSBSS of the present invention having a melt flow rate ≥100 g/10 min. has sufficiently high molecular weight that it is not volatile and exhibits excellent elasticity and toughness while its high flow characteristics enable application as a melt blown fiber, fabric, or low basis weight film. At least 3 different processes can be envisioned to combine a tough, elastic high flow hSBS or hSBSS with a fiberglass mat or scrim.
1. The melt blown fibers could be co-blown when the fiberglass is produced such that the tough, elastic fibers penetrate the thickness of the fiberglass mat.
2. The film can be melt coated on top of a pre-existing fiberglass mat or scrim.
3. The melt blown fabric or film can be laminated to the fiberglass mat or scrim.

In asphalt roofing applications, it is important that such roofs be able to withstand hail damage. Thus it is desired to increase the impact resistance of the roofing article. Such roofing materials are composites comprising at least one fiber glass mat and asphalt as the binder. In this example, the hSBS or hSBSS was produced as a low basis weight film which was then laminated to a fiberglass mat. A surprisingly low basis weight of the styrenic block copolymer was required in order to achieve a significant increase in the fiberglass mat's impact resistance. The following materials were used in this example.
Materials:
1. A 13.5 osy—ounces per square yard (~450 g/m$^2$—grams per square meter) chopped fiberglass mat was purchased from US Composites. This type of mat is commonly used for mold, automotive, and boat building applications. This mat typically requires 24 osy resin to provide sufficient toughness.
2. hSBS extruded film at 6.5 mil thickness which is ~4.2 osy or 140 g/m$^2$.

Experimental Conditions

HSBS film was extruded on a Killion film extruder with temperature settings of 300-330-360-370° F. with the die set to 370° F.

Fiberglass mat samples were cut into 15 inch-wide sections. HSBS film thicknesses having 140, 280, and 560 grams per square meter were overlaid on top of the fiberglass mat sections. The multi-layer construction was passed through a two roll laminator with the roll temperature set to 350° F. 10 cm×10 cm squares were cut out of the laminated fiberglass mat sections and baked at 450° F. for 90 seconds with no applied pressure.

The 10 cm×10 cm laminated fiberglass mat sections were tested in a Dynatup Instrumented Impact Tester Model 8250 where a weight of 4.2 lbs was impacted into the sample at a velocity of 8400 in/min. The total impact force was measured by a load cell and the total impact energy was reported in in-lbf. The impact test temperature was 23° C.

Surprisingly, a melt coating of hSBS applied at only 140 gsm results in an increase in the total impact energy by an order of magnitude from 2 in-lbf to 20 in-lbf, see Table 1 and FIG. 1. This basis weight is significantly lower than that of a reactive resin reported to provide sufficient toughening. As the hSBS basis weight was increased in the laminated fiberglass mat, the total impact energy continued to increase such that the combination of basis weight and impact resistance could be tailored for specific applications. Generally laminated fiberglass mats of the present invention containing 50 to 1000 g/m$^2$ of the inventive hSBS have an average impact energy of at least 2 times, preferably at least 3 times more, compared to mats having no hSBS.

TABLE 1

| Sample | hSBS basis wt., g/m$^2$ | AVG Total Impact Energy, in-lbf | ST DEV Total Energy, in-lbf |
| --- | --- | --- | --- |
| Fiberglass mat control | 0 | 2.0 | 0.8 |
| Fiberglass 1 | 140 | 20.0 | 0.6 |
| Fiberglass 2 | 280 | 28.6 | 4.0 |
| Fiberglass 4 | 560 | 41.0 | 0.0 |

Fiberglass reinforced mats, combined with bitumen, fillers and surfacing materials, find employment in forming roofing shingles, roofing membranes, insulation, sound mitigating articles, vibration damping articles, wind resistant articles, and geo-membranes having vegetative root growth resistance.

Thermoset composites containing fiberglass reinforced mats wherein said thermoset is epoxy, urethane, polyester, acrylic, or a vinyl ester resin, and the inventive hSBS find utility in composite articles intended for industrial, automotive, aerospace, or consumer applications such as boat hulls, car body panels, turbine blades, hulls, sound mitigating articles, vibration damping articles, wind resistant articles, a geo-membrane having root growth resistance, or a molding sheet.

Example 3: Low Viscosity Coatings

Low viscosity polymers (hSBS and hSBSS, as described above) are of interest in applications where VOC (volatile organic carbon) restrictions must be met. HSBS has a high melt flow rate (low viscosity) and was compared to other low viscosity polymers. It has been determined that only 4 VOC exempt solvents can be considered with hSBS, namely methyl acetate, p-chlorobenzotriflouride, t-butyl acetate, and acetone. In areas where non-VOC restrictions are acceptable, any non-exempt solvent (organic solvents that are not exempt) compatible with the low viscosity polymer may be employed. Exemplary non-exempt solvents are Aromatic 100 (a light aromatic naphtha), Aromatic 200 (a heavy aromatic naphtha), xylene, toluene, and the like. Coatings comprising a blend of solvent (exempt, non-exempt, or a mixture thereof) and at least 40 wt. % of the styrenic block copolymer of the present invention of hSBS or hSBSS have a VOC content of <450 grams/liter, preferably <350 grams/liter, and more preferably <250 grams/liter.

To determine the base line effect on viscosity for high melt flow polymers, solutions were prepared in toluene and viscosity was measured on a Brookfield viscometer at room temperature. Results were recorded in centipoise (cps). See Table 2. Results show that hSBS has the lowest viscosity compared to other SEBS (hydrogenated styrene-butadiene-styrene) polymers; G1643 has a melt flow rate of about 19 g/10 min., G1726 has a melt flow rate of about 85 g/10 min., and Polymer 2 has a melt flow rate of about 43 g/10 min. All melt flow rates were all measured at 230° C. and 2.16 kg mass.

TABLE 2

Toluene blends

|  | Solids | | |
| --- | --- | --- | --- |
|  | 15% | 25% | 35% |
| hSBS | 16 | 88 | 422 |
| G1643(SEBS) | 38 | 219 | 1285 |
| Polymer 2 modified from USSN 13/243,533 | 59 | 412 | 2483 |
| G1726(SEBS) |  | 200 | 465 |

Effect of Xylene/PCBTF Blends on Polymer Viscosities

Solution viscosities of solvent blends comprising xylene and VOC exempt solvent p-chlorobenzotriflouride (PCBTF) were measured. Solutions were made with G1643 and hSBS polymers at 15, 20, and 25 wt % solids content. Results were measured in centipoise (cps). See Table 3. HSBS had the lowest viscosity compared to G1643. Viscosity increases as PCBTF displaces xylene in solutions.

TABLE 3

|  | Polymer solids, % | | | | | |
| --- | --- | --- | --- | --- | --- | --- |
|  | G1643 | | | hSBS | | |
| Xylene/PCBTF | 15 | 20 | 25 | 15 | 20 | 25 |
| 100/0 | 44 | 112 | 265 | 21 | 47 | 102 |
| 70/30 | 62 | 170 | 423 | 28 | 66 | 158 |
| 50/50 | 81 | 241 | 638 | 35 | 91 | 221 |
| 30/70 | 110 | 352 | 986 | 46 | 132 | 334 |
| 0/100 | 165 | 790 | 2583 | 81 | 263 | 754 |

White Roof Coating Formulations

Elastomeric white roof coatings have more stringent requirements such as the VOC must not be more than 250 g/L (grams per liter). Elastomeric white roof coating formulations were made to compare solution viscosities of G1643 and hSBS polymers. Formulations were targeted to meet a VOC of 250 grams/liter and all ingredient concentrations are listed in wt %. Reduced viscosity has a significant effect on the application basis weight and drying time of the coating. HSBS resulted in a coating formulation with suitable properties and lower viscosity than G1643. See Table 4. The requirements for elastomeric roof coatings are listed in ASTM D6083. The viscosity requirement is 85-141 cps as measured by ASTM D562 Method A Procedure A.

TABLE 4

| Formulation | 3-1 (G1643) | 3-2 (hSBS) | 3-6 (G1643) | 3-3 (hSBS) |
| --- | --- | --- | --- | --- |
| Aromatic 100 | 13.81 | 14.3 | 14.1 | 14.7 |
| Oxsol 100 PCBTF | 32.59 | 32.12 | 31.7 | 31.1 |
| Kraton G1643 SEBS | 21.42 |  | 18.1 |  |
| Kraton hSBS |  | 21.42 |  | 18.3 |
| Kristalex 3070 LMW endblock resin | 10.19 | 10.19 | 10.1 | 10.4 |
| Indopol H1900 | — | — | 4.4 | 4.4 |
| Irganox 1010 | 0.32 | 0.31 | 0.31 | 0.32 |
| Tinuvin 328/770 | 0.25 | 0.25 | 0.25 | 0.25 |
| Fungicide | 0.42 | 0.42 | 0.41 | 0.42 |
| TiO$_2$ | 9.65 | 9.65 | 9.5 | 9.1 |
| CaCO$_3$ | 11.35 | 11.35 | 11.2 | 11.0 |
| Total | 100 | 100 | 100 | 100 |
| Calculated VOC, g/L | 250 | 250 | 250 | 250 |
| PCBTF/Aromatic 100 | 70/30 | 69/31 | 69/31 | 68/32 |
| Solids/Solvent, wt. % | 53.3/46.7 | 53.3/46.7 | 53.9/46.1 | 53.9/46.1 |
| Solids/Solvent, vol. % | 50.0/50.0 | 50.7/49.3 | 50.6/49.4 | 51.5/48.5 |
| poly/midblk/endblk resin | 100/0/47.6 | 100/0/47.6 | 100/24/57 | 100/24/57 |
| Stormer Viscosity | >141 | 137 | >141 | 119 |

Aromatic 100 is the only solvent approved in Europe for white roof applications.

The Stormer Viscosities >141 cps do not meet ASTM D562 Method A Procedure A. However, hSBS meets this requirement.

Example 4: Adhesive Formulations

As noted previously, APO based adhesive formulations are low cost and low performance. They are, however, sprayable which enables applicability to a wide range of articles. The performance of APO adhesive formulations can be upgraded to at least a mid-range performance by blending with hSBS of the present invention. The formulation is still sprayable, unlike many mid-range performance polymers, including traditional SEBS based formulations based on SEBS polymer with melt flow rates less than 100 g/10 min. Adhesive formulations find utility in pressure sensitive adhesives, hot melt adhesives, construction adhesives, elastic adhesives, and the like. Generally these formulations contain styrenic block copolymers of the present invention, poly-alpha-olefin resins, tackifying resins, and optional ingredients such as mineral oil, antioxidants, etc. Typically these compositions include poly-alpha-olefin present from about 30 to about 80 wt. % of said composition, styrenic block copolymer hSBS and/or hSBSS present from about 10 to about 35 wt. % of said composition, and said tackifying resin present from about 20 to about 60 wt. % of said composition.

Experimental Conditions

Standard peel, tack, cohesion, and viscosity tests were carried out on these formulations as described in the Test method manual for Pressure Sensitive Tapes from the Pressure Sensitive Tape Council (PSTC), the standard FINAT test method for Pressure sensitive materials, the AFERA test methods for Pressure Sensitive Adhesive Tapes, and the ASTM related methods. Different testing surfaces have been used in determining the formulations' function in the application: chromed stainless steel plates (No. 304"ss") as recommended by the FINAT and Kraft paper.

Rolling Ball Tack (RBT) is the distance, expressed in centimeters, a steel ball rolls on the adhesive film with a standard initial velocity (Pressure Sensitive Tape Council Test No. 6; ASTM D3121-73). Small numbers indicate aggressive tack.

Loop Tack (LT) was determined using PSTC-5 and FTM 9 loop tack method. High numbers LT indicate aggressive tack.

180 Degree Peel Adhesion was determined by Pressure Sensitive Tape Council Method No. 1 and ASTM D3330-83. Large numbers indicate high strength when peeling a test tape from a steel substrate.

The SAFT (shear adhesion failure temperature) was measured by 2.5×2.5 cm Mylar to chromed ss plates with a 1 kg mass. The samples are placed in an oven and the temperature increased by 22° C./min. SAFT measures the temperature at which the lap shear assembly fails.

Holding Power (HP) is the time required to pull a standard area (2.5×1.3 cm) of tape from a standard test surface (steel=ss) under a standard load (1 kg, 2 or 5 kg), in shear at 2° (Pressure Sensitive Tape Council Method No. 7; ASTMD-3654-82). Long times indicate high adhesive strength. Results are expressed in hours (h) or minutes (mins.). The type of failure mode is expressed as adhesive failure (AF) or cohesive failure (CF). This test can be carried out at room temperature (about 23° C.) or at a more elevated temperature, depending on the test.

Preparation of Adhesive Formulations

No particular limitation is imposed on the preparation process of the adhesive compositions in the present invention. Therefore, any process such as, a mechanical mixing process making use of rolls, a Banbury mixer or a Dalton kneader, a hot-melt process characterized in that heating and mixing are conducted by using a melting kettle equipped with a stirrer, a high shear Z-blade mixer, a single- or twin-screw extruder, a solvent process in which the compounding components are poured in a suitable solvent and stirred, thereby obtaining an intimate solution of the pressure sensitive adhesive composition may be used.

The test formulations shown in Table 5 were hot melt mixed in a high shear sigma blade mixer that was blanketed with nitrogen. Typical order of addition was polymer combined with stabilizer, then resin followed by addition of oil. Mixing time averaged about one hour for the preparation of the homogeneous adhesive. Samples were then coated on 4 mil Mylar® film as a hot melt drawn down with a heated doctor blade to the average film thicknesses give in Table 5. General test results are reported in Table 6. Hot melt test results are reported in Table 7.

TABLE 5

Test Formulation Composition

| Formulations wt % | HMA1-hSBS | HMA2 | HMA3 | HMA4 | HMA5 |
|---|---|---|---|---|---|
| hSBS | 16.5 | | | | |
| G1643 (SEBS) | | 16.5 | | | |
| G1657 (SEBS) | | | 16.5 | | |
| D1155 (SBS) | | | | | 20 |
| Rextac 2730 APAO | 50 | 50 | 50 | 60 | |
| Eastotac H-100W Resin | 33.5 | 33.5 | 33.5 | 40 | |
| Drakeol 34 | | | | | 20 |
| Regalite S5100 Resin | | | | | 60 |
| Total | 100 | 100 | 100 | 100 | 100 |
| Irganox 1010 | 0.5 | 0.5 | 0.5 | 0.5 | 0.5 |
| Appearance after mixing | smooth & waxy | smooth | smooth | smooth | smooth & yellow |
| Average Film Thickness (mil) | 50 | 55 | 60 | 50 | 55 |

TABLE 6

Testing Results

| | | | | | |
|---|---|---|---|---|---|
| Appearance of melt coated test samples | smooth translucent | smooth translucent | grainy, melt fractured translucent | smooth clear | smooth yellow |
| 180° Peel Strength, pli | 3.7 | 4.4 | 2.9 | 0.8 | 8.5 |
| Comment | adhesive failure | adhesive failure | cohesive failure on steel | did not adhere to Mylar. Adhesive failure to steel | cohesive failure to steel |
| SAFT, ° C. | 75 | 77 | 66 | No tack | 62 |
| Holding power to steel, min. | >9000 | >9000 | 884/221 | No tack | 2052/1543 |
| Loop tack, lbf | 0.46 | 0.52 | 0.59 | 0.12 | 10.4 |
| Rolling ball tack, cm | >30 | >30 | >30 | >30 | >30 |
| After 200° F./7 day + 250° C./2 day aging | | | | | |
| appearance (1 layer, 2 layers, grainy) | smooth | smooth | smooth | smooth | smooth |
| color | white | white | white | white | yellow |

TABLE 7

Hot Melt Viscosity Results of the Test Results

|  | HMA1-hSBS | HMA2 | HMA3 | HMA4 | HMA5 |
|---|---|---|---|---|---|
| Viscosity at 350° F. | 4,125 | 6,900 | 10,030 | 1,750 | 1,325 |
| Viscosity at 300° F. | 12,300 | 23,980 | NM** | 4,200 | 2,000 |
| Viscosity at 250° F. | NM | NM | NM | 10,050 | 17,800 |

*Brookfield Viscometer, Spindle 27, units in centipoises (cps)
**NM = not measured due to already excessive viscosity What is particularly useful for the hSBS application of sprayable hot melt adhesives for non-woven construction is: (1) saturated polymer backbone for thermal and color stability; (2) an adhesive failure mechanism; and (3) hot melt viscosity under 10,000 cps at 350° F. (typical spray application temperature) that enables acceptable spray performance. The control formulation consisting of the APO only (HMA4) has desirable low viscosity, and a saturated backbone but exhibits unacceptably poor adhesion properties, i.e. almost no measureable tack or peel. The adhesive formulation of HMA4 adhered poorly to both the Mylar® (polyester) and stainless steel substrates.

The data reveals that adding 16.5 wt. % of the block copolymer hSBS in a blend with APO affords low hot melt viscosity along with a reasonable balance of adhesive properties. Only the formulations HMA1 and HMA2 were observed to fail adhesively which is the preferable failure mechanism for non-woven construction adhesives.

The comparison formulation using SBS in HMA5 has the issue of color stability and long term aging due to the unsaturated polybutadiene rubber phase. This type of industry standard formulation using SBS in HMA5 (20% polymer, 60% resin, 20% oil) has low polymer content (for economy and low melt viscosity) and this negatively affects the failure mechanism of the adhesive.

Example 5: Film and Nonwoven Examples for Personal Hygiene Applications

Table 8 demonstrates that film made from the high melt flow SEBS (Inventive hSBS) has equivalent or better mechanical properties to film made from lower melt flow hSBS polymer formulations (Comparative 1 and 2). Melt flow rates measured at 230° C. and 2.16 kg for MD6705 and MD6717 were 48 g/10 min. and 55 g/10 min. respectively. The recovered energy for Example 3 is 90% and the tensile set is 5%, indicating exceptional elasticity for such a low molecular weight polymer. In addition, Table 8 shows that the high melt flow SEBS has excellent elasticity, up to 300% elongation at break. Good elasticity at high elongation, or strain, is also an indicator that the stress relaxation should be low. Low stress relaxation results in a better fit versus time for the elastic components in an absorbent personal hygiene garment or article such as a diaper.

Table 9 is a comparison of mechanical properties for a melt blown fabric made from the high melt flow polymer (Inventive hSBS) to typical films used in personal hygiene applications at similar basis weights (Comparative 3 and 4). Because the basis weights are similar and all of the tested samples were the same width, force can be used as an indicator of strength and modulus at various strains. Table 9 demonstrates that the Inventive hSBS fabric, in the machine direction, has equivalent or better 100% and 300% modulus and 100% and 300% hysteresis performance to Comparative 3 and 4 in the cross direction. In addition, the inventive hSBS fabric has equivalent or better performance (modulus and hysteresis) than Comparative 4 in machine direction. The elongation at break and tensile strength at break are significantly lower for the Inventive hSBS fabric when compared to the film comparatives because the films can strain harden while the melt blown fabric is inherently limited by its structure. Consequently, since most commercial personal hygiene applications do not require strains much higher than 300%, the Inventive hSBS fabric demonstrates that an ultra high melt flow hSBS could perform well in personal hygiene elastic components.

The mechanical properties are measured in the cross direction (perpendicular to the extrusion direction). Hysteresis is measured at 100% elongation. Comparative 1 (MD6705) is a compound made with an 18 MFR high vinyl SEBS. Comparative 2 (MD6717) is also a compound made with the same 18 MFR SEBS but it also contains a high melt flow polyolefin. The inventive hSBS has a melt flow rate of 220 g/10 min. Comparative 3 is a typical personal hygiene elastic film compound made with a relatively high molecular weight and low MFR hSBS (Kraton G). Comparative 4 is a film made from a typical personal hygiene SIS polymer (D1114).

TABLE 8

Cast Film Mechanical Properties

| Polymer/ Property | MFR (230° C./2.16 kg), g/10 min. | Tensile Strength, MPa | Elong. at Break, % | Recovered Energy 1$^{st}$ cycle, % | Hysteresis Set, % |
|---|---|---|---|---|---|
| Comparative 1 (MD6705) | 50 | 11 | 700 | 90 | 5 |
| Comparative 2 (MD6717) | 53 | 13 | 820 | 56 | 9 |
| Inventive hSBS | 220 | 11 | 750 | 90 (83*) | 5 (9*) |

*Hysteresis properties at 300% elongation.

TABLE 9

Melt Blown Fabric Mechanical Properties

| Test | Inventive hSBS Melt Blown Fabric* (50 g/m²) | | Comparative 3 (Typical Elastic Film Kraton ™ G) (54 g/m²) Film Direction | | Comparative 4 (Kraton ™ D1114) SIS Polymer Film (62 g/m²) | |
|---|---|---|---|---|---|---|
| | MD | CD | MD | CD | MD | CD |
| 100% Mod (N) | 0.18 | 0.09 | 0.27 | 0.13 | 0.09 | 0.09 |
| 300% Mod (N) | 0.5 | 0.13 | 0.8 | 0.3 | 0.18 | 0.13 |
| Tensile (N) | 0.7 | 0.18 | 5.8 | 4.0 | 4 | 3.6 |
| Elongation to Break (%) | 450 | 530 | 830 | 810 | 1300 | 1300 |
| 100% Hysteresis Tensile Set (%) | 6.8 | NA | 4.5 | 4.8 | 7.2 | 7.7 |
| 100% Hysteresis Recovered Energy (%) | 84 | NA | 90 | 90 | 90 | 90 |
| 300% Hysteresis Tensile Set (%) | 11 | NA | 9 | 6.5 | 13 | 15 |
| 300% Hysteresis Recovered Energy (%) | 73 | NA | 73 | 84 | 95 | 94 |

*The Example 4 melt blown nonwoven fabric was made on a 5 inch wide melt blown line.

Example 6: Slush & Rotational Molding Example

Compounds based on inventive polymer hSBS show improved melt properties when used in low shear processes such slush molding and rotational molding processes. Typical formulations of slush molding and rotational molding compounds may be seen in Table 10.

TABLE 10

| | Formulation | | | |
|---|---|---|---|---|
| | 100 | | 104 | |
| Ingredient | % | lbs | % | lbs |
| Polymer 2 modified from USSN 13/243,533 | 60.1 | 30.0 | | |
| Inventive hSBS | | | 60.1 | 30.0 |
| poly-1-butene | 13.3 | 6.7 | 13.3 | 6.7 |
| polypropylene | 9.5 | 4.7 | 9.5 | 4.7 |
| Aliphatic Oil | 8.5 | 4.2 | 8.5 | 4.2 |
| Plastomer | 4.1 | 2.1 | 4.1 | 2.1 |
| Slip Additive | 3.9 | 2.0 | 3.9 | 2.0 |
| Antioxidant | 0.39 | 0.20 | 0.39 | 0.20 |
| UV absorber | 0.20 | 0.10 | 0.20 | 0.10 |
| Total | 100.0 | 50.0 | 100.0 | 50.0 |

Modifed Polymer 2 has a polystyrene end block mol. wt. of 7.2 kg/mol and a total apparent mol. wt. of 127 kg/mol., with a MFR of about 43 g/10 min. at 230° C. and 2.16 kg/mass.

Figure 2:
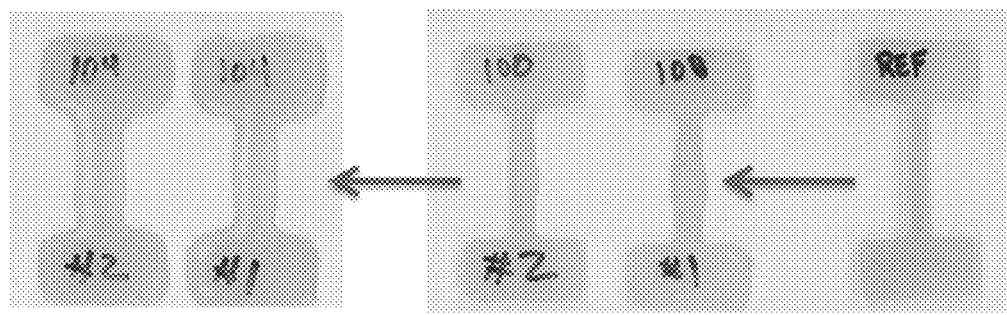
FIG. 2 is a photo of the test specimens associated with Tables 10 and 11.

Manufacture of these compounds were performed on standard plastic compounding equipment such as a co-rotating twin screw extruder equipped with underwater pelletizing apparatus familiar to one skilled in the art. Extruder barrel zone temperatures increased from 160° C. to 210° C. down the length of the barrel and the adapter and die temperatures were 210° C. to 230° C. The melt temperatures of the described compounds were 210° C. and 240° C. for Formulations 100 and 104, respectively. Evaluation of the suitability for low shear processes such as slush molding or rotational molding was established by measuring flow at zero shear rate on compression molded test samples. Test specimens were die cut from a compression molded plaques that were nominally 3 mm in thickness. See FIG. 2. The height and width of the sample was measured at its center point. The specimen was then placed onto a flat plate and put into a preheated convection oven at 230° C. for 90 seconds. When it was removed from the oven, the specimen was allowed to cool for approximately 5 minutes and the sample thickness was re-measured again at its center point. (REF) is the non-heated reference specimen. Formulation (100) reference specimen is subjected to melt test based on prior art. Formulation (104) is the inventive formulation incorporating hSBS.

Afterwards the height and width of the samples was measured again and a % Melt is calculated according to Equation 1, and the results are in Table 11.

$$\% \text{ Melt} = \frac{Thickness_{initial} - Thickness_{final}}{Thickness_{initial}} \times 100 \qquad \text{Eq. 1}$$

TABLE 11

Melt Performance

| Compound | Initial Thickness (mm) | Initial Width (mm) | Final Thickness (mm) | Final Width (mm) | Melt Time (s) | % Melt |
|---|---|---|---|---|---|---|
| 100 | 3.11 | 2.42 | 1.53 | 5.93 | 90 | 51% |
| 100 | 3.11 | 2.46 | 1.52 | 5.22 | 90 | 51% |
| 104 | 3.17 | 2.44 | 1.18 | 7.61 | 90 | 63% |
| 104 | 3.12 | 2.43 | 1.09 | 8.26 | 90 | 65% |

Tabulated results and visual inspection of the test specimens showed that the example compound containing the Inventive hSBS (104) exhibits a higher flow under zero shear rate conditions and therefore a higher % melt as calculated according to Eq. 1.

Example 7: Laminating Adhesive

The Inventive hSBS coupled polymer and tackifier were dry blended (Examples 2-7 in Table 12). The melt blend was extruded at 180° C. and 250 rpm screw speed (twin screw extruder) and then compression molded (100 micron thickness) under 5 MPa, at 200-220° C. having a width of 25 mm. The 100 micron thick film was sandwiched between two Teflon films. One side of the Teflon film was peeled off and the adhesive was transferred to the nylon textile that is also 25 mm in width. The film and nylon were laminated together by hot press at 160° C. for 0.5 sec. and at 0.5 MPa, then the other Teflon film was removed and the laminate was again hot press heated at 160° C. for 5.0 sec. and at 0.8 MPa. After aging for 24 hours at 23° C. and 50% relative humidity, al 80° C. peel strength was measured with the cross head speed of 300 mm/min., over the 23 mm width. Inventive hSBS is the polymer described in Ex. 1. G1643 (MFR=18 g/10 min. @ 230° C./2.16 kg), 1657 (MFR=10 g/10 min. @ 230° C./2.16 kg) and 1726 (MFR=65 g/10 min. @ 230° C./2.16 kg) are hydrogenated sequential SBS polymers. The results are set forth in Table 12.

TABLE 12

| # | Base polymer | Polymer [phr] | Tackifier Type | Tackifier [phr] | MFR 160° C./2.16 kg [g/10 min.] | Adhesive strength onto Nylon textile [N/25 mm] Heat seal, 160° C./5 sec/8 kg |
|---|---|---|---|---|---|---|
| 1 | Inventive hSBS | 100 | NONE | 0 | 10 | Control - 12 |
| 2 | Inventive hSBS | 100 | Regalite R1100 | 10 | 27 | 16 |
| 3 | Inventive hSBS | 100 | Regalite S5100 | 30 | 40 | 18 |
| 4 | Inventive hSBS | 100 | KE-311 | 30 | 65 | 14 |
| 5 | Inventive hSBS | 100 | Regalite R1100 | 50 | 150 | 20 |
| 6 | Inventive hSBS | 100 | Regalite R1100 | 100 | 195 | 23 |
| 7 | Inventive hSBS | 100 | Regalite R1100 | 150 | >200 | 15* |
| 8 | G1726 | 100 | None | 0 | 3 | 7** |
| 9 | G1657 | 100 | None | 0 | <1 | 5 |
| 10 | G1643 | 100 | None | 0 | <1 | 6 |

*Non-stable peel force due to increased rigidity of adhesive.
**wide variation (2-10N) due to stringy cohesive failure
Regalite R1100: Fully hydrogenated C9 resin (Eastman)
Regalite S5100: Partially hydrogerated C9 resin (Eastman)
KE-311: Rosin Ester (Arakawa Chemical)

Suitable tackifier is selected form the group of rosin ester, or partially or fully hydrogenated $C_9$ resin. The amount of tackifier is in a range from about 5 to about 150 parts by weight per 100 wt. parts of the polymer.

Thus it is apparent that there has been provided, in accordance with the invention several applications for the use of the unique and novel hSBS or hSBSS block copolymer that has a MFR of at least 100 g/10 min. as measured at 230° C. and 2.16 kg mass that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly it is intended to embrace all such alternatives, modifications and variations as fall within the spirit and broad scope of the appended claims.

The invention claimed is:

1. A textile comprising a laminating adhesive, wherein the laminating adhesive comprises a blend of:
    a) a styrenic block copolymer, wherein the styrenic block copolymer is:
        i) a selectively hydrogenated (SBS) styrene-diene-styrene block copolymer, or
        ii) a selectively hydrogenated (S-EB/S-S) controlled distribution styrene-diene/styrene-styrene block copolymer, wherein the diene is butadiene, isoprene or a mixture thereof,
    wherein said styrenic block copolymer has a melt flow rate equal to or greater than 125 g/10 min. measured at 230° C. with a 2.16 kg load, and
    b) a tackifying resin.
2. The textile of claim 1, wherein said styrenic block copolymer has a minimum linear true peak molecular weight (Mp) of about 45,000, a polystyrene content of between about 18 to about 45%, a vinyl content of about 65 to 80%, and a coupling efficiency of about 60 to about 97%, said blend having a melt flow rate greater than about 15 g/10 min. at 160° C. and 2.16 kg.
3. The textile of claim 1, wherein said tackifying resin is present from about 5 to about 250 wt. parts per 100 wt. parts of said hydrogenated SBS.
4. The textile of claim 1, wherein said tackifying resin is either partially or fully hydrogenated C9 resin.
5. The textile of claim 1, wherein said tackifying resin is a rosin ester.
6. The textile of claim 1, wherein said hydrogenated SBS has a polystyrene content of between about 18 to about 33%.
7. The textile of claim 1, wherein said styrenic block copolymer has a structure of either sequential polymerization of each block polymer, or coupled polymerization wherein diblocks (S-EB or S-EB/S) are formed, and 2 or more diblocks are coupled together via a coupling agent.

* * * * *